(12) United States Patent
Bottou et al.

(10) Patent No.: US 6,587,588 B1
(45) Date of Patent: Jul. 1, 2003

(54) PROGRESSIVE IMAGE DECODER FOR WAVELET ENCODED IMAGES IN COMPRESSED FILES AND METHOD OF OPERATION

(75) Inventors: Léon Bottou, Highlands, NJ (US); Paul Glor Howard, Morganville, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/464,387

(22) Filed: Dec. 16, 1999

Related U.S. Application Data

(60) Provisional application No. 60/124,660, filed on Mar. 16, 1999.

(51) Int. Cl.⁷ ................................................. G06K 9/36
(52) U.S. Cl. ........................ 382/240; 382/248; 382/233; 375/240.11
(58) Field of Search ................................. 382/232, 233, 382/235, 236, 240, 244, 245, 248, 249, 251; 375/240.1, 240.11, 240.12, 240.16, 240.17, 240.18

(56) References Cited

U.S. PATENT DOCUMENTS

| | | | |
|---|---|---|---|
| 6,130,911 A | * 10/2000 | Lei | 375/240.16 |
| 6,246,798 B1 | * 6/2001 | Andrew et al. | 382/240 |
| 6,347,157 B2 | * 2/2002 | Chui | 382/240 |
| 6,356,666 B1 | * 3/2002 | Atsumi et al. | 382/240 |
| 6,392,692 B1 | * 5/2002 | Monroe | 348/143 |
| 6,421,464 B1 | * 7/2002 | Tran et al. | 382/232 |

* cited by examiner

Primary Examiner—Bhavesh M. Mehta
Assistant Examiner—Ali Bayat

(57) ABSTRACT

A progressive image display decoder and method of operation for wavelet encoded images achieves reduced memory storage requirements for wavelet transform coefficients and reduced execution time in displaying the image thereby overcoming the limitations of the prior art. Conveniently, a wavelet image format, typically DjVu IW44 facilitates progressive rendering and smooth scrolling of large color or gray level images with limited memory requirements. The progressive wavelet decoder is composed of two components. The first component decodes the incoming image data and updates an array of wavelet coefficients. The second component applies an inverse wavelet transform to the array of wavelet coefficients for the purpose of reconstructing the image. The operation of the first component (the decoder) is triggered by the incoming compressed image data. The received data is decoded and is used to apply updates to an array of wavelet coefficients. Each update improves the accuracy of the coefficients and therefore improves the fidelity of the reconstructed image. The coefficient array is composed of several two-dimensional arrays (one for each of the color components) having one entry corresponding to each 32×32 blocks in the image. Each entry contains 1024 wavelet coefficients organized as a sparse array with two levels of indirection. The operation of the second component (the renderer) is typically triggered when enough data has been received to display an updated version of the image, or when the user performs an action which requires displaying a new part of the image. In the latter case, the renderer only reconstructs the pixel values for the parts of the image, which are needed. A further reduction of the computation time is obtained by using "lifting" for implementing a fast inverse wavelet transform.

15 Claims, 6 Drawing Sheets

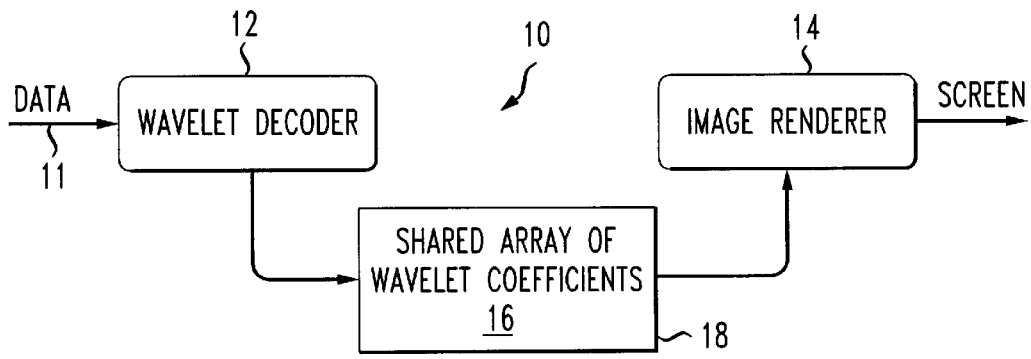
FIG. 1
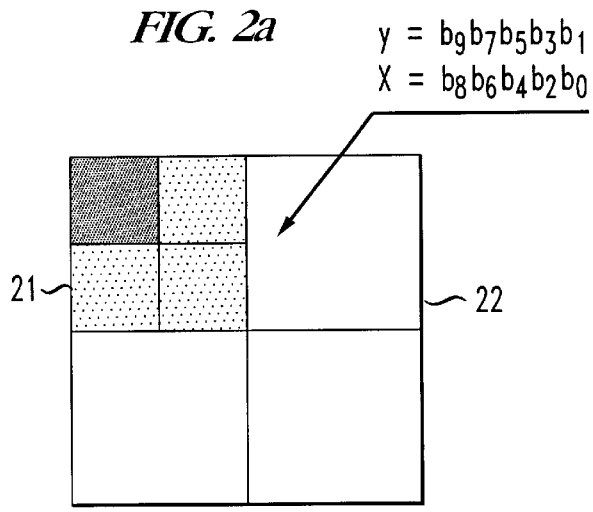
FIG. 2a  $y = b_9b_7b_5b_3b_1$
$X = b_8b_6b_4b_2b_0$
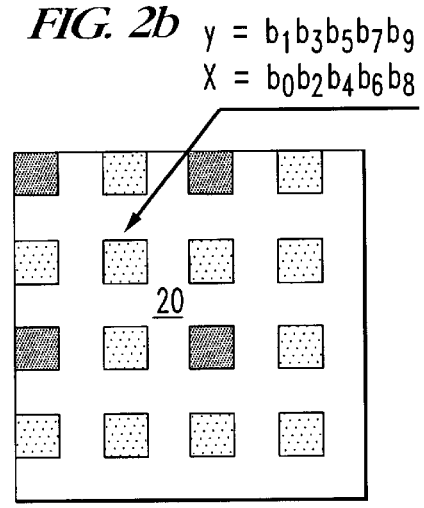
FIG. 2b  $y = b_1b_3b_5b_7b_9$
$X = b_0b_2b_4b_6b_8$
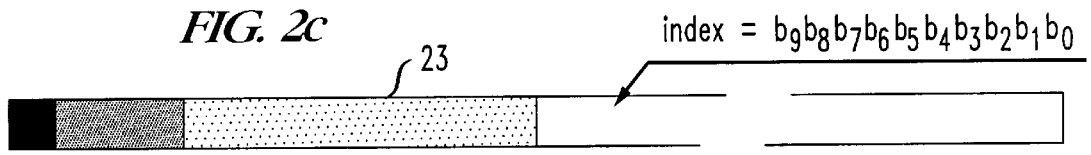
FIG. 2c  index = $b_9b_8b_7b_6b_5b_4b_3b_2b_1b_0$

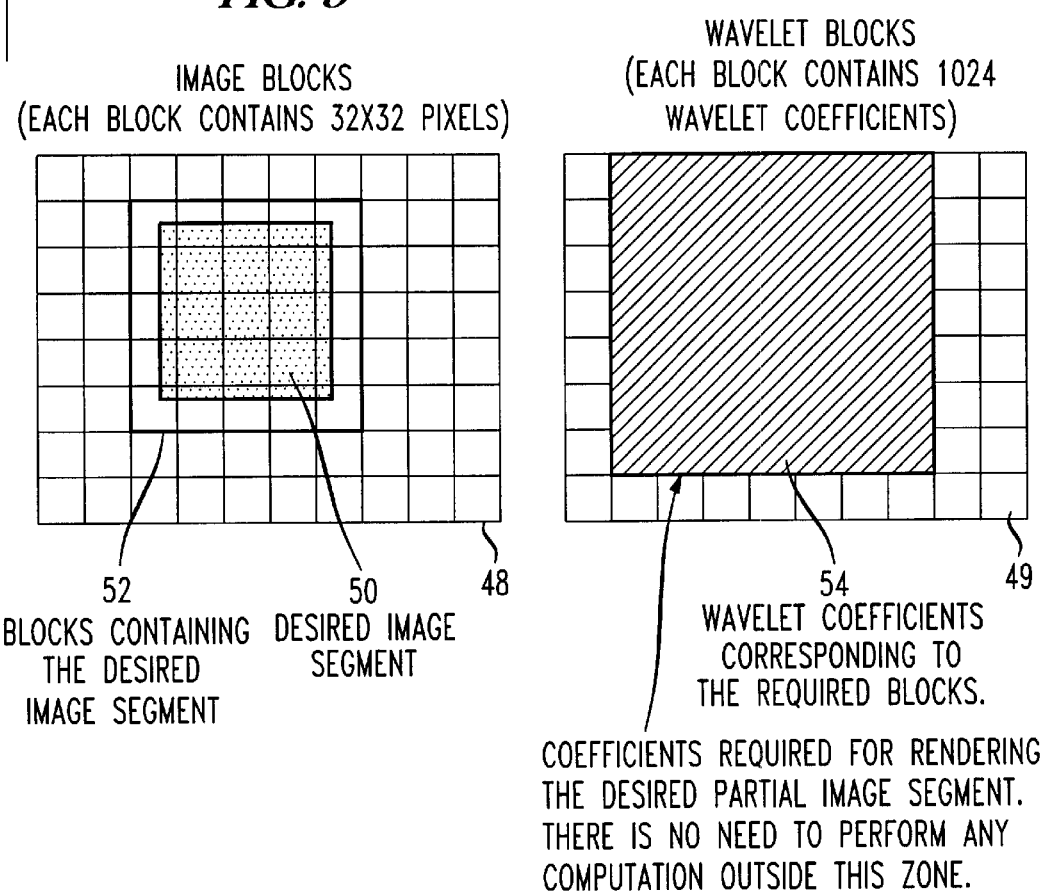
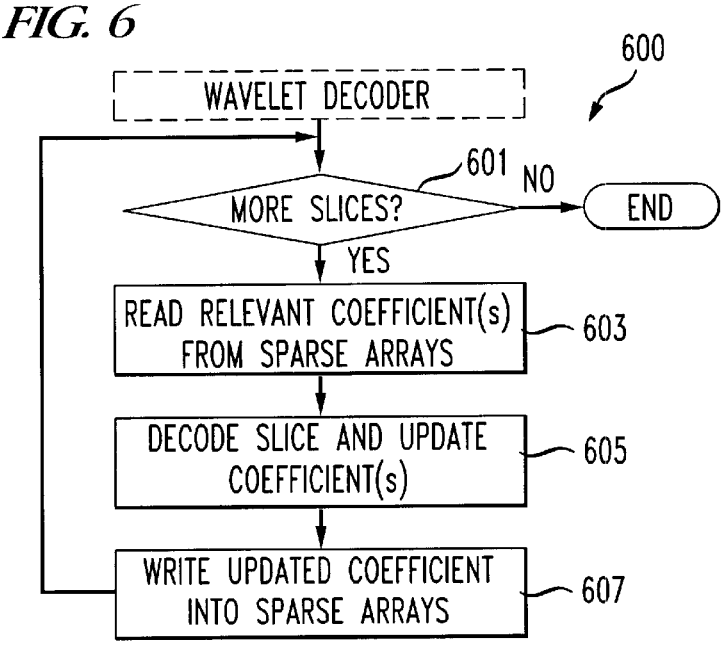

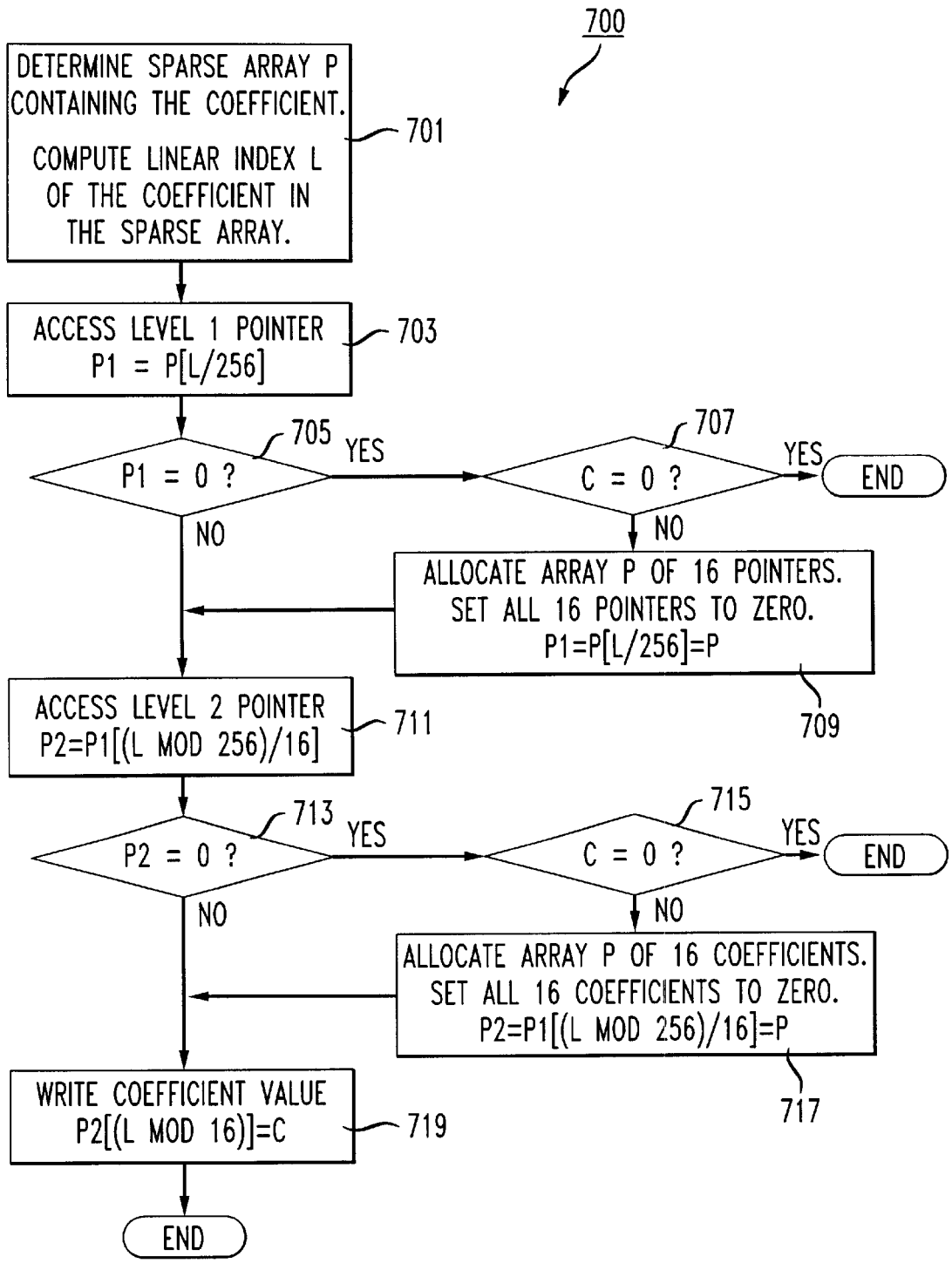

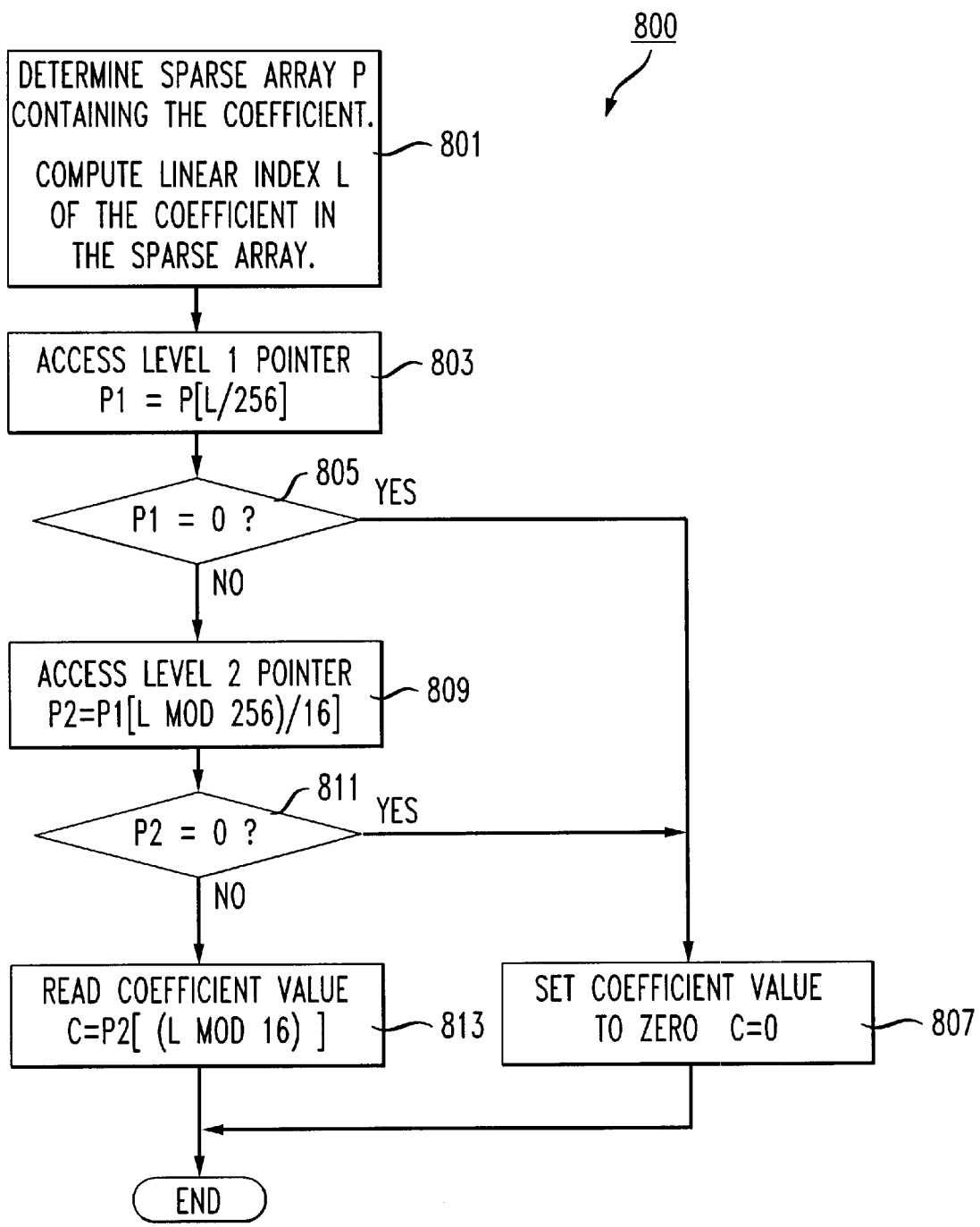

PROGRESSIVE IMAGE DECODER FOR WAVELET ENCODED IMAGES IN COMPRESSED FILES AND METHOD OF OPERATION

This application claims the benefit of the filing date of provisional application Serial No. 60/124,660, filed Mar. 16, 1999 and assigned to the same assignee as that of the present invention.

BACKGROUND OF INVENTION (1) Field of Invention

This invention relates to progressive image transmission and methods of operation. More particularly, the invention relates to progressive image decoders for wavelet encoded images in compressed files and methods of operation.

(2) Description of Prior Art

Multi-resolution wavelet decomposition is one of the most efficient schemes for the compression of grayscale and color images. Reference 1—[Mallat1989]. Decoding a compressed file consists of two essential operations, which usually are performed in sequence:

Decoding the wavelet coefficients. The compressed data is transformed into wavelet coefficients according to a predefined wavelet coefficient decoding scheme. This decoding scheme often relies on a context based statistical decoder such as the Z-Coder. Reference 2—[Bottou, Howard and Bengio1998].

Reconstructing the image. The wavelet coefficients are combined according to a predefined rule which produces the image pixels. This predefined rule usually consists of applying an inverse wavelet transform and a color space conversion.

Progressive decoders are useful when compressed data comes out of a slow transmission channel. The compressed data must be organized as a sequence of slices describing how to update the wavelet coefficients resulting from the previous slices. The first slices describe the coefficients with very little accuracy. Subsequent slices increase the accuracy of the wavelet coefficients. The image can be reconstructed at any time using the current approximation of the true wavelet coefficients.

Therefore a wavelet image viewer can quickly display a low quality image and refine it when more data is available. A Progressive Decoder can be viewed as composed of a Wavelet Decoder and an Image Renderer operating in parallel (See FIG. 1). The two units communicate via a shared array of wavelet coefficients.

The Wavelet Decoder processes the slices as soon as they are available and updates the values stored in the shared array of wavelet coefficients.

The Image Renderer combines the values stored in a shared array of wavelet coefficients and computes the pixel values on demand. A wavelet image viewer, for instance, may redisplay the complete image whenever sufficient additional data is available. The user may also use scrollbars and uncover new parts of the image. The Image Renderer computes the corresponding pixel values on demand.

Processing large images with such architecture creates many problems. The size of the wavelet coefficient array may exceed the available memory in the system. The Image Renderer is usually triggered by an action from the user and therefore should complete the computation without noticeable delay. A need exists in progressive image transmission to overcome the problems of memory requirements and delay in displaying large images.

Prior art related to progressive image transmission and decoding include the following:

U.S. Pat. No. 5,880,856 entitled "Progressive Image Transmission Using Discrete Wavelet Transform" by P. Ferriere, issued Mar. 9, 1999, filed Dec. 5, 1994 discloses transforming a still image into a plurality of decomposition levels using a discrete wavelet transform. Each decomposition level comprises a plurality of subimages which allow reconstruction of an image representation of the still image. The decomposition levels are transmitted beginning with a base decomposition level providing a low level of image resolution and then proceeding with decomposition levels providing increasingly higher levels of image resolution. Within each decomposition level, rows of the various subimages are arranged or interlaced together in contiguous blocks so that all data for a single row, at a single decomposition level is transmitted together. At the receiving end the row blocks are reconstructed and displayed as they are received.

U.S. Pat. No. 5,602,589 entitled "Video Image Compression Using Weighted Wavelet Hierarchical Vector Quantization" by M. Vishwanath et al, issued Feb. 11, 1997 discloses a method and apparatus for compressing and decompressing a video image. Input data representing an image is successively subjected to (i) levels of a first table lookup to obtain compressed data representing a sub-band of a discrete wavelet transform followed by vector quantization. The compressed data is transmitted to a receiver. The compressed data is subjected to multiple stages of a second table lookup operation to selectively obtain decompressed data representing at least a partial inverse sub-band transform of the compressed data. The table lookups simplify decoder hardware and provide efficient encoding and decoding.

None of the prior art addresses the problem of decreasing memory requirement for a wavelet decoder and speeding the display of fragments of progressively encoded images.

SUMMARY OF THE INVENTION

A progressive image display decoder and method of operation for wavelet encoded images achieves reduced memory storage requirements for wavelet transform coefficients and reduced execution time in displaying the image thereby overcoming the limitations of the prior art. Conveniently, a wavelet encoded image format, typically DjVu IW44 facilitates progressive rendering and smooth scrolling of large color or gray level images with limited memory requirements. The progressive wavelet decoder is composed of two components. The first component decodes the incoming image data in compressed files and updates an array of wavelet coefficients stored in a memory. The second component applies an inverse wavelet transform to the array of wavelet coefficients for the purpose of reconstructing the image. The operation of the first component (the decoder) is triggered by the incoming compressed image data. The received data is decoded and is used to apply updates to the array of wavelet coefficients stored in the memory. Each update improves the accuracy of the coefficients and therefor improves the fidelity of the reconstructed image. The coefficient array is composed of several two-dimensional arrays (one for each of the color components) having one entry corresponding to each 32×32 blocks in the image. Each entry contains 1024 wavelet coefficients organized as a sparse array with two levels of indirection. The operation of the second component (the renderer) is typically triggered when enough data has been received to display an updated version of the image, or when the user performs an action which requires displaying a new part of the image. In the latter case, the renderer only reconstructs the pixel values for the parts of the image, which are needed. A further reduction of the computation time is obtained by using "lifting" for implementing a fast inverse wavelet transform.

DESCRIPTION OF THE DRAWING

The invention will be further understood from the following detailed description of a preferred embodiment taken in conjunction with an appended drawing, in which:

FIG. 1 is a representation of a progressive image decoder including a wavelet decoder, an image renderer, both the decoder and renderer communicating with a shared array of wavelet coefficients stored in a memory and incorporating the principles of the present invention.

FIG. 2a is a representation of a traditional "Mallat" organization of wavelet coefficients.

FIG. 2b is a representation of interleaved wavelet coefficients required by a Lifting Transform.

FIG. 2c is a representation of linearized wavelet coefficients used by an IW44 shared array of coefficients in the progressive image decoder of FIG. 1.

FIG. 5 is a representation of a display screen in the renderer of FIG. 1 when a user scrolls an image on a display and a Partial Image Renderer only reconstructs those parts of the image which are uncovered by the scrolling operation.

FIG. 6 is a flow chart of the operation of the wavelet decoder of FIG. 1 in writing updated coefficients into the sparse array of FIG. 3.

FIG. 7 is a flow chart for updating a coefficient C into the sparse array of FIG. 3.

FIG. 8 is a flow chart for reading a coefficient C from the sparse array of FIG. 6.

DESCRIPTION OF PREFERRED EMBODIMENT

Figure 3:
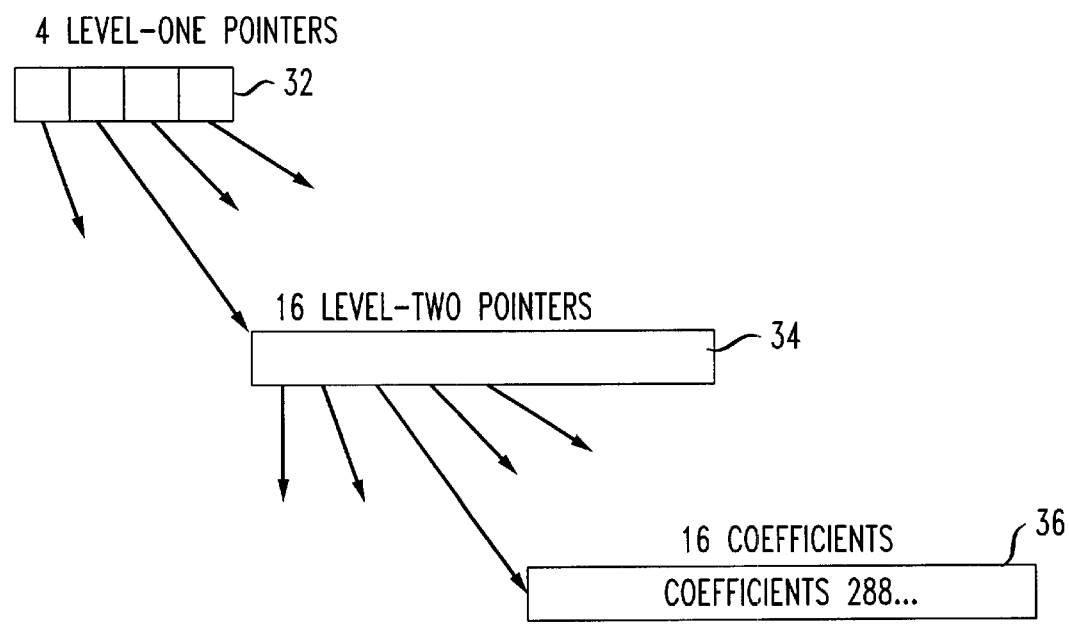
FIG. 3 is a representation of a sparse array for storing coefficients in the shared array of FIG. 1.

Before describing the present invention of FIG. 1, a brief description of the compressed image file is believed appropriate for a better understanding of the decoder and the process of decoding the image file.

Image data for large images may be compressed/decompressed by any of the well known formats e.g. GIF, JPEG, etc. for use in the present invention. However, one image compression/decompression format which is especially suitable for the decoder of FIG. 1 is DjVu created by the assignee of the present invention. The DjVu specification is available on the World Wide Web at (http://dejavu.research.att.com/) and also from. AT&T Shannon Laboratory, 180 Park Avenue, P. O. Box 971, Florham Park, N.J. 07932-0971. The DjVu IW44 component deals with wavelet encoded images and facilitates progressive rendering and smooth scrolling of large color or gray level images with limited memory requirements. Briefly, DjVu is a non-bit-preserving (lossy) compression method and file format for coding color, gray scale and bi-level images. DjVu is especially suitable for compound images consisting of foreground text and background photographic or graphic images. Algorithms are designed for efficient storage, retrieval, and display of scanned documents on the World Wide Web. DjVu provides high compression rates by handling text and images differently, each in an efficient way. DjVu provides progressivity, allowing an application to find text, then to display the images using a progressive buildup. DjVu is designed to be implemented using data structures appropriate for efficient navigation within an image.

The section numbers of the specification which are relied upon to decode color and gray scale images will now be described, as follows 2.0. Decoding IW44 Files A Grayscale IW44 Image consists of one color component. A Color IW44 Image consists of three-color components.

The IW44bit stream is coded using the EA IFF 85 format preceded by a four-octet preamble. The format consists of a file header and chunks. Each chunk consists of a chunk header followed by chunk data. The chunk header consists of a four-octet type ID followed by a four-octet integer specifying the number of octets of chunk data in the chunk.

Chunk data consists of a short header whose length is determined by the chunk type, followed by a stream of arithmetically coded data. The arithmetic coder used is the Z'-Coder, a binary arithmetic coder. The Z'-Coder is a variant of the Z-Coder. Reference 1 [Bottou, Howard and Bengio1998]. When exactly two choices are possible for a given event, the Z'-Coder is used without modification.

2.1 IFF Chunk Structure 2.1.1 Preamble

The first four octets of an IW44 file are 0×41 0×54 0×26 0×54. This preamble is not part of the EAIFF85 format, but it is required in order to identify IW44 files. After the four-octet preamble, an IW44 file consists of a sub-file coded using the EAIFF85 format (hereinafter referred to as "IFF" or "the IFF format"). The parts of the IFF format used with IW44 are described as needed in this document.

2.1.2 IFF File Structure

An IFF file consists of a number of chunks. Each chunk has a header and data. The header of a chunk consists of a four-octet chunk-type field and a four-octet length field. The length is coded most significant octet first. The strings that identify the types of the chunks in an IFF file are defined by the application. A chunk whose type is not recognized by the application is to be ignored.

In the IFF format, chunks may be nested: a chunk may contain other chunks as part of its data. In the IW44 format, there is only one chunk at the outermost nesting level, a FORM chunk. All other chunks appear within the FORM chunk, sequentially, with no nesting.

Each chunk, including those nested within another chunk, must begin on an even octet boundary; that is, the number of octets in the file before the beginning of the chunk must be an even integer. If the length of a chunk other than the last chunk is odd, a single padding octet whose value is 0×00 is placed between the chunk and the following chunk.

2.1.3 IFF Headers

An IFF header consists of a four-octet ASCII string identifying the chunk type, a four-octet integer containing the length of the data, most significant octet first, and the data. The length of the data includes only the actual data in the chunk. It does not include the eight-octet IFF header. It does not include the padding octet that may be present after the data. It does include data headers that may be present in the data. The length of a FORM chunk includes the padding octets that may be present at the end of the chunks nested within the FORM chunk.

2.1.4 IFF Chunk Sequence

The IFF chunk types used in IW44 are the following: FORM, PM44, and BM44. All files contain a FORM chunk, inside which all the other chunks are nested. The first four data octets of the FORM chunk are a secondary identifier.

If this secondary identifier is BM44, then the file describes a Grayscale IW44 Image. The chunk FORM then contains one or more chunks BM44 coding the Grayscale image data.

If this secondary identifier is PM44, then the file describes a Color IW44 Image. The chunk FORM then contains one or more chunks PM44 coding the color image data Chunks of types PM44 and BM44 have the same structure. The chunk consists of a chunk header followed by arithmetically coded wavelet coefficient updates. The coefficients are organized in a hierarchical fashion.

2.2 Definitions

Color component. Color IW44 Images contain color image data. Grayscale IW44 Images contain Grayscale image data. Color image data is coded using three color components, called Y, Cb, and Cr. These correspond to the usual YCbCr color space, adjusted to facilitate transformation to the RGB color space. Grayscale image data is coded using one color component called Y which corresponds to the grayscale intensity of the image.

Color chunk. A color chunk is a chunk of type PM44, or BM44. A color chunk contains wavelet coefficient update information for one or three color components.

Block. A block of pixels of size 32×32 or less. The blocks are numbered starting in the lower left corner of the image. All blocks are 32×32 except possibly those along the right edge or top edge; those blocks may be smaller if the image dimensions are not divisible by 32.

Block count. The number of blocks in the image, denoted by $N_B$.

Wavelet block. The set of coefficients associated with one block of the image, in one color component. There are 1024 wavelet coefficients in a wavelet block, numbered 0 through 1023. The coefficients in a wavelet block have effects on the reconstruction of other blocks in the image, but for coding purposes they are considered to be localized within the block in which they are coded.

Bucket. A particular set of 16 wavelet coefficients within a wavelet block. A wavelet block consists of 64 buckets, numbered 0 through 63.

Band. A subset of wavelet coefficients for a given color component. There are 10 bands, the correspondence among band numbers, coefficient coefficients, and bucket coefficients being given by the following table:

| Band number | Coefficient indices | Bucket indices |
|---|---|---|
| 0 | 0–15 | 0 |
| 1 | 16–31 | 1 |
| 2 | 32–47 | 2 |
| 3 | 48–63 | 3 |
| 4 | 64–127 | 4–7 |
| 5 | 128–191 | 8–11 |
| 6 | 192–255 | 12–15 |
| 7 | 256–511 | 16–31 |
| 8 | 512–767 | 32–47 |
| 9 | 768–1024 | 48–63 |

Color band number. The current band number for a color component. Each color component's color band number starts at 0, and increases by 1 until it reaches 9 as described below; then it is reset to 0.

Color band. A subset of the coefficients of one color component of the image, consisting of updates of all the coefficients in the image whose indices within their respective blocks are those corresponding to the current color band's color band number.

A slice is the highest level subdivision of a color chunk. A slice contains data for one color band for each of the color components in a color layer, that is, for three-color components for a color image, or for one color component for a grayscale image.

Block band. A subset of the coefficients of one color component of a wavelet block, consisting of updates of the coefficients in the block whose indices are those corresponding to a given band.

Chrominance delay counter. An integer counter that indicates how additional slices in a color layer contain a color band only for the Y color component, and not for the Cb and Cr color components. The chrominance delay counter is initialized to the value specified in the first PM44 or BM44 chunk, and decremented by 1 after each slice in the color layer until it reaches 0.

2.3 Color Chunks within an IW44 File

There may be more than one PM44 or BM44 chunks in an IW44 file. If there is more than one such color chunk, the coefficient updating is continuous across the chunks, and the data is taken from the chunks in the order in which they appear in the file. Nothing is reinitialized at the beginning of chunks after the first color chunk of these types, except for the low-level arithmetic coder.

Each color component is coded using a Dubuc-Deslauriers-Lemire (4,4) Interpolative Wavelet Transform. Reference 3 [Sweldens1996]. The image is transformed into a set of wavelet coefficients, one wavelet coefficient for each pixel in the original image. This transform is especially effective for coding images at high compression ratios.

The value of each coefficient is coded in a distributed fashion, through a number of cycles. Within one cycle, each coefficient is updated once (that is, in only one of the 10 bands), and receives approximately one additional bit of information. Specifically, from cycle to cycle the absolute value of a coefficient is first narrowed down by eliminating possible values for the most significant non-zero bit until the correct most significant non-zero bit is found. The sign is coded in the same cycle in which the most significant non-zero bit is found. Then in each subsequent cycle, one additional bit of the value is coded.

2.4 Color Chunk Data Headers

A color chunk begin with a data header consisting of 2 or 9 octets, as follows:

Serial number. A one-octet unsigned integer. The serial number of the first chunk of a given chunk type must be 0. Successive chunks are assigned consecutive serial numbers.

Number of slices. A one-octet unsigned integer. The number of slices coded in the chunk.

Major version number and color type. One octet containing two values, present only if the serial number is 0. The least significant seven bits designate the major version number of the standard being implemented by the decoder. For this version of the standard, the major version number is 1. The most significant bit is the color type bit. The color type bit is 0 if the chunk describes three color components. The color type bit is 1 if the chunk describes one color component.

Minor version number. A one-octet unsigned integer, present only if the serial number is 0. This octet designates the minor version number of the standard being implemented by the decoder. For this version of the standard, the minor version number is 2.

Image width. A two-octet unsigned integer, most significant octet first, present only if the serial number is 0. This field indicates the number of pixels in each row of the image described by the current chunk. The image width will be less than the width of the original image if the chunk describes a layer coded at lower resolution than the original image.

Image height. A two-octet unsigned integer, most significant octet first, present only if the serial number is 0. This field indicates the number of pixels in each column of the image described by the current chunk. The image height will be less than the height of the original image if the chunk describes a layer coded at lower resolution than the original image.

Initial value of chrominance delay counter. A one-octet unsigned integer, present only if the serial number is 0. Only the least significant seven bits are used. The most significant bit is ignored, but should be set to 1 by an encoder. This field specifies the initial value of the chrominance delay counter, used as described below.

2.5 Color Chunk Data 2.5.1 Hierarchical Structure of a Coded Color Layer

The data coded in a color chunk consists of information needed to reconstruct wavelet coefficients. There are one or three color components; each color component has its own set of wavelet coefficients. Within a color component, there are 1024 wavelet coefficients for each 32×32 block of the image.

Coding is divided into a series of slices. The slices may be coded in one chunk, or they may be separated into a number of chunks. The only difference it makes whether the slices are coded in one chunk or in several chunks is in the order of progressive rendering; the final reconstructed image will be the same. The number of slices in each chunk is specified in the color chunk data header. One slice contains refinement data for one color band for each color component. Within a color component, all coefficients in a slice are in the same band.

A color chunk describes the full image at the spatial resolution implied by the image width and image height fields in the data header of the first chunk of the same type as the current color chunk.

The sequence of color components within a slice is: first Y, then Cb, then Cr, although the Cb and Cr components are not present in a slice if the chunk describes grayscale data or if the chrominance delay counter is not equal to 0 at the time the slice is coded.

A color band is made up of coefficient updates for all blocks in the image, but only for coefficients that are in the currently active band for the color component. Each block's set of updates within a color band is called a block band. The block bands are coded block by block, by rows from bottom to top, and from left to right within each row.

Within a block band, there are 16, 64, or 256 coefficient updates. The coefficients being updated are divided into buckets, each bucket containing 16 coefficients. Thus, a block band contains 1, 4, or 16 buckets. The buckets and coefficients being updated are determined by the color band number.

2.5.1.1 Band Counting

The header of the first color chunk contains an initial value for the chrominance delay counter. It may be 0 or a positive integer.

At the beginning of the first color chunk, the color band number for each of the three-color components is set to 0. At the beginning of each slice, the chrominance delay counter is tested. If the chrominance delay counter is 0 and if the slice describes color image data, then all three-color components are present. If the chrominance delay counter is greater than 0 or if the chunk describes grayscale image data, only the Y color component is present for the slice. At the end of a slice, the following actions take place:

The color band number is increased by 1 for the Y component. If the new color band number exceeds 9, it is set to 0.

If the chrominance delay counter is 0; the color band numbers for the Cb and Cr components are increased by 1. If the new color band numbers exceed 9, they are set to 0. (Note: The color band numbers for the Cb and Cr components are always equal to each other.)

If the chrominance delay counter is greater than 0, it is decreased by 1.

A color chunk ends when the number of slices specified in the color chunk header have been coded.

At the beginning of each color chunk after the first, the chrominance delay counter and color band numbers retain the values they had at the end of the previous color chunk.

2.5.2 Quantization of Coefficients

All wavelet coefficients are quantized. The quantization is uniform (i.e., the quantization bin step size is the same for all steps), except for the bin including the coefficient whose value is 0. The number of coefficient values encompassed by that bin is twice the step size minus 1.

| Coefficient index | Quantization threshold table index |
|---|---|
| 0 | 0 |
| 1 | 1 |
| 2 | 2 |
| 3 | 3 |
| 4–7 | 4 |
| 8–11 | 5 |
| 12–15 | 6 |
| 16–31 | 7 |
| 32–47 | 8 |
| 48–63 | 9 |
| 64–127 | 10 |
| 128–191 | 11 |
| 192–255 | 12 |
| 256–511 | 13 |
| 512–767 | 14 |
| 768–1023 | 15 |

2.5.2.1 Initialization of Quantization Bin Step Sizes

The initial values of the quantization bin step sizes are given in the following table. There is a separate table of step sizes for each color component. Each color component's table is given the same initial values.

| Quantization threshold table index | Initial value |
|---|---|
| 0 | 0x04000 |
| 1 | 0x08000 |
| 2 | 0x010000 |
| 3 | 0x010000 |
| 4 | 0x010000 |
| 5 | 0x020000 |
| 6 | 0x020000 |
| 7 | 0x020000 |
| 8 | 0x040000 |

-continued

| Quantization threshold table index | Initial value |
| --- | --- |
| 9 | 0x040000 |
| 10 | 0x040000 |
| 11 | 0x080000 |
| 12 | 0x040000 |
| 13 | 0x040000 |
| 14 | 0x040000 |
| 15 | 0x080000 |

2.5.2.2 Reduction of Quantization Bin Step Sizes

Each slice contains one band of coefficient update information for each color component. At the end of a slice, the quantization bin step sizes are divided by 2 for the current band for each color component. The indices of the quantization bin step sizes to be reduced for each band are given in the following table.

| Band number | Quantization Threshold table indices |
| --- | --- |
| 0 | 0–6 |
| 1 | 7 |
| 2 | 8 |
| 3 | 9 |
| 4 | 10 |
| 5 | 11 |
| 6 | 12 |
| 7 | 13 |
| 8 | 14 |
| 9 | 15 |

Step sizes are always integer powers of 2. When a step size of 1 is divided by 2, the result is set to 0.

2.6 Coefficient Updating

Within a block band, each coefficient in the block band may be updated. A block band is decoded by a preliminary flag computation followed by four passes. One or more of the passes may be skipped or may not require any decoding, depending on conditions present at the beginning of the block band's coding and on tests made during the decoding of previous block band passes. The 4 passes are:

1. Decoding the decode buckets decision for the block band.
2. Decoding the decode coefficients decision for buckets in the block band.
3. Decoding the activate coefficient decision for coefficients in the block band, and determining the sign of newly activated coefficients.
4. Decoding the update decisions for previously active coefficients.

During the coefficient updating process, a number of binary decisions are decoded. Each decision is decoded using the Z'-Coder. Decoding a decision using the Z'-Coder may be done with a conditioning context, or it may be done using the pass-through mode of the Z'-Coder. For color chunk decoding, there are up to 584 conditioning contexts, up to 294 conditioning contexts for the background layer and up to 294 conditioning contexts for the foreground layer. Within a layer, there are 98 conditioning contexts for each color component; one or three color components may be present for each layer. If the image is a grayscale image the contexts are as follows:

1 context in each color component is for the decode buckets decision.

80 contexts in each color component are for the decode coefficients decision, 8 for each of the 10 bands.

16 contexts in each color component are for the activate coefficient decision.

1 context in each color component is for the increase coefficient decision.

The coefficient sign is decoded using the pass-through mode of the Z'-Coder. For all occurrences of the increase coefficient decision for any coefficient after the first such decision, the increase coefficient decision is coded using the pass-through mode of the Z'-Coder.

2.6.1 Preliminary Flag Computation

Flags are computed for each coefficient in the block band, for each bucket in the block band, and for the block band as a whole.

1. Flag computation for coefficients. For each coefficient in a block band, there is a value of the quantization threshold. For each coefficient, there are two flag values, based on the value of the coefficient and the value of the coefficient's quantization threshold. The flags are called ACTIVE and POTENTIAL. At most one of the flag values may be SET for a coefficient in a given cycle. If the coefficient's quantization threshold is either 0 or greater than or equal to 0x8000, then both flag values are CLEAR. The two flag values are:

(a) ACTIVE: The coefficient's ACTIVE flag value is SET if the coefficient's quantization threshold is greater than 0 and less than 0x8000, and the coefficient's value is not 0. Otherwise the coefficient's ACTIVE flag value is CLEAR. The sign of the coefficient is known, and the most significant non-zero bit of its absolute value is known.

(b) POTENTIAL: The coefficient's POTENTIAL flag value is SET if the coefficient's quantization threshold is greater than 0 and less than 0x8000, and the coefficient's value is 0. Otherwise the coefficient's POTENTIAL flag value is CLEAR. It is possible that the value of this coefficient will become non-zero during this cycle.

2. Flag computation for buckets. Each bucket has two flag values associated with it depending on the flags of the 16 coefficients in the bucket. The bucket flags have the same names as the coefficient flags. Both, one or neither of the bucket flags may be SET for a bucket in a given cycle.

(a) ACTIVE: The bucket's ACTIVE flag is SET if any of the coefficients in the bucket have ACTIVE flags SET. Otherwise the bucket's ACTIVE flag value is CLEAR.

(b) POTENTIAL: The bucket's POTENTIAL flag is SET if any of the coefficients in the bucket have POTENTIAL flags SET. Otherwise the bucket's POTENTIAL flag value is CLEAR.

3. Flag computation for the block band. The block band has two flag values associated with it depending on the flags of the buckets in the block band. The block band flags have the same names as the bucket flags. Both, one or neither of the block band flags may be SET for a block band in a given cycle. The block band flag values are not needed if the number of buckets in the block band is less than 16.

(a) ACTIVE: The block band's ACTIVE flag is SET if any of the buckets in the block band have ACTIVE flags SET. Otherwise the block band's ACTIVE flag value is CLEAR.

POTENTIAL: The block band's POTENTIAL flag is SET if any of the buckets in the block band have POTENTIAL flags SET. Otherwise the block band's POTENTIAL flag value is CLEAR.

2.6.2 Block-band-decoding Pass

If the block band contains fewer than 16 buckets, the block-band-decoding pass is skipped. If the block band's ACTIVE flag is SET, the block-band-decoding pass is skipped. If the block band contains 16 buckets, and if the block band's ACTIVE flag is CLEAR, and if the block band's POTENTIAL flag is SET, then the decode buckets decision is decoded. If the decode buckets decision is YES, the bucket-decoding pass is performed for the block band. If the decode buckets decision is NO, the bucket-decoding pass and the newly-active-coefficient-decoding pass are skipped for the block band.

2.6.2.1 Arithmetic Decoding

For each color component, there is a single context for use in decoding the decode buckets decision.

If the value returned by the Z'-Coder for the decode buckets decision is 1, then the value of the decode buckets decision is YES. If the value returned by the Z'-Coder is 0, then the value of the decode buckets decision is NO.

2.6.3 Bucket-decoding Pass

Each bucket has a flag called the coefficient-decoding flag. If the bucket-decoding pass is not skipped, then for each bucket in the block band, if the bucket's POTENTIAL flag is SET, then the decode coefficients decision for the bucket is decoded. If the decode coefficients decision is YES, then the bucket's coefficient-decoding flag is SET; otherwise it is CLEAR.

2.6.3.1 Arithmetic Decoding

For each color component, there are 80 contexts for use in decoding the decode coefficients decision. For each of the 10 bands, there are 8 contexts. There are four contexts that may be used if the block band's ACTIVE flag is SET, and four contexts that may be used if the block band's ACTIVE flag is CLEAR. If the band number is 0, then $n_0=0$. Otherwise, the value of $n_0$ is computed as follows:

1. The bucket number is multiplied by 4, giving a result t.
2. The coefficients numbered t, t+1, t+2, and t+3 are examined, and the number $n_0$ of coefficients with value 0 among the four coefficients is counted.
3. If $n_0=4$, $n_0$ is reduced to 3.

Then the value of $n_0$ is used as the index to one of the four contexts, for the given color component, band, and block band ACTIVE flag value.

If the value returned by the Z'-Coder for the decode coefficients decision is 1, then the value of the decode coefficients decision is YES. If the value returned by the Z'-Coder is 0, then the value of the decode coefficients decision NO.

2.6.4 Newly-active-coefficient-decoding Pass

If the newly-active-coefficient-decoding pass is not skipped, then for each bucket in the block band, the coefficient-decoding flag is tested. For a given bucket, if the coefficient-decoding flag is SET, then the following procedure is followed for each coefficient in the bucket: If the coefficient's POTENTIAL flag is SET, then the activate coefficient decision is decoded. If the activate coefficient decision is YES, then the sign of the coefficient $s_\pm$, with value +1 or −1, is decoded. Then the coefficient is set equal to:

$$3/2 \times s_\pm \times \text{coefficient's quantization threshold}$$

2.6.4.1 Arithmetic Decoding

For each color component, there are 16 contexts for use in decoding the activate coefficient decision. There are eight contexts that may be used if the block's ACTIVE flag is SET, and eight contexts that may be used if the block's ACTIVE flag is CLEAR. The index of the context to be used from among the 8 possible contexts is computed as follows:

1. The coefficients in the bucket are examined, and the number $n_p$ of them whose POTENTIAL flag is SET is computed.
2. Loop through the coefficients whose POTENTIAL flag is SET.
   (a) Compute $i_p=\min(7, n_p)$.
   (b) Use $i_p$ as the index into the set of 8 possible contexts, given the color component and value of the block's ACTIVE flag.
   (c) Decode the activate coefficient decision using the context; if the activate coefficient decision is YES, decode the sign using the pass-through mode of the Z'-Coder, and set $n_p=0$.
   (d) If $n_p>0$, decrement $n_p$ by 1.

If the value returned by the Z'-Coder for the activate coefficient decision is 1, then the value of the activate coefficient decision is YES. If the value returned by the Z'-Coder is 0, then the value of the activate coefficient decision is NO.

The decoding of the sign $s_\pm$, of a newly activated coefficient uses the pass-through mode of the Z'-Coder. If the value returned by the Z'-Coder is 1, then $s_\pm=-1$. If the value returned by the Z'-Coder is 0, then $s_\pm=+1$.

2.6.5 Previously-active-coefficient-decoding Pass

For all coefficients in the block band, the following procedure is followed: If the coefficient's ACTIVE flag is SET, the increase coefficient decision is decoded. If the decision is NO, the absolute value of the coefficient is reduced by half of the coefficient's quantization threshold. If the decision is YES, the absolute value of the coefficient is increased by half of the coefficient's quantization threshold.

2.6.5.1 Arithmetic Decoding

For each color component, there is a single context for use in decoding the increase coefficient decision. This context is used to decode the increase coefficient decision if the absolute value of the coefficient is less than or equal to 3 times the value of the quantization threshold for the coefficient. Otherwise, the pass-through mode of the Z'-Coder is used.

Whether the context or the pass-through mode is used, if the value returned by the Z'-Coder for the increase coefficient decision is 1, then the value of the increase coefficient decision is YES. If the value returned by the Z'-Coder is 0, then the value of the increase coefficient decision NO.

2.7 Image Reconstruction

At any time during the decoding process, an image may be reconstructed from the wavelet coefficients already decoded. The wavelet coefficients are stored in three two-dimensional arrays one for each of the Y, Cb, and Cr color components. Each array has one entry for each image block. Each entry itself is a 1024-element one-dimensional array. The elements of each one-dimensional array are the wavelet coefficients. The wavelet coefficients are signed fixed-point numbers with six fractional bits.

2.7.1 Sequence of Operations

To reconstruct the image from the coefficients, the following steps must be performed:

1. Reordering coefficients. For each color component, each of the 1024-element coefficient arrays is converted into a 32×32 coefficient array. These square coefficient arrays are embedded into a larger reconstruction array whose size is the size of the image.
2. Inverse wavelet transform. For each color component, the inverse wavelet transform is applied to the larger reconstruction array. The inverse transform is applied at progressively finer scales, and within each scale in each of the two directions, first vertically, then horizontally.

3. Precision reduction. For each color component, the data values in the reconstruction array are reduced to eight bits.

4. Conversion to RGB color space. For color images, the eight-bit values of each pixel in the YCbCr color space are converted to the corresponding eight-bit values in the RGB color space.

2.7.2 Coordinate System

For indexing the blocks within a color component, the origin (0,0) is at the lower left corner of the image. Horizontal indices increase rightward, and vertical indices increase upward.

For indexing the coefficients within a 32×32 block coefficient array, the origin (0,0) is at the lower left corner of the block. Horizontal indices increase rightward, and vertical indices increase upward.

For indexing the coefficients and color values within the image in the reconstruction array, the origin (0,0) is at the lower left corner of the image. Horizontal indices increase rightward, and vertical indices increase upward.

2.7.3 Reordering Coefficients

Within each color component, the coefficients in each block are moved from a 1024-element linear array into a 32×32 square array. The square array from each block is embedded in a reconstruction array the size of the full image.

The mapping from indices in the linear array to indices in the square array is as follows: if the ten bits of the index in the linear array are $b_9b_8b_7b_6b_5b_4b_3b_2b_1b_0$, bit $b_9$ being the most significant bit of the index, then the bits of the row index of the square array are $b_1b_3b_5b_7b_9$, bit $b_1$ being the most significant bit of the row index, and the bits of the column index of the square array are $b_0b_2b_4b_6b_8$, bit $b_0$ being the most significant bit of the column index.

If the number of rows in the image is not a multiple of 32, then blocks along the top edge of the image have fewer than 32 rows. If the number of columns in the image is not a multiple of 32, then blocks along the right edge of the image have fewer than 32 columns. For all such blocks, all coefficients are coded; however, coefficients that fall outside the boundary of the image after the coefficient mapping described above are never used, regardless of their value.

2.7.4 Inverse Wavelet Transform

The inverse transformation from wavelet coefficients to color values is done independently for the three-color components. Within a color component the transform is done for a decreasing sequence of scale parameters s. For a given scale parameter s, the transform is done first for columns, then for rows. Within a column or row, the transform is done in two passes, a lifting pass and then a prediction pass.

The scale parameter's initial value is s=16. After the vertical and horizontal transformations have been done with a given value of s, the value of s is divided by 2 and the next pair of transformations is performed. After the vertical and horizontal transformations have been performed with s=1, the inverse wavelet transform for the color component is complete.

The pair of transformations for a given value of s involve only rows and columns whose indices are multiples of s. The vertical transformation involves transforming the coefficients in column 0 whose row indices are multiples of s, then repeating the transformation for all other columns whose column indices are multiples of s. Some of the coefficients transformed by the vertical transformation will already have been transformed during earlier iterations with larger values of the scale parameter s.

The horizontal transformation involves transforming the coefficients in row 0 whose column indices are multiples of s, then repeating the transformation for all other rows whose row indices are multiples of s. The coefficients transformed by the horizontal transformation will have been transformed by the vertical transformation during the first pass for the current scale parameter s. Some of the coefficients transformed by the horizontal transformation will already have been transformed during earlier iterations with larger values of the scale parameter S.

To transform one column or row of coefficients:

1. If transforming a column, select the coefficients in the current column that come from rows whose indices are multiples of s. The coefficient from row ks is referred to as $c_k$. The largest value of k is referred to as $k_{max}$.

If transforming a row, select the coefficients in the current row that come from columns whose indices are multiples of s. The coefficient from column ks is referred to as $c_k$. The largest value of k is referred to as $k_{max}$.

2. Lifting. For each even-numbered subscript k, $0 \leq k \leq k_{max}$, replace coefficient $c_k$ with $$c_k - \left\lfloor \frac{9(c_{k-1} + c_{k+1}) - (c_{k-3} + c_{k+3}) + 16}{32} \right\rfloor$$

Special cases

If k−3<0, use $c_{k-3}=0$.
If k−1<0, use $c_{k-1}=0$.
If k+1>$k_{max}$, use $c_{k+1}=0$.
If k+3>$k_{max}$, use $c_{k+3}=0$.

3. Prediction. For each odd-numbered subscript k, $0 \leq k \leq k_{max}$, modify coefficient $c_k$ as follows:

(a) If k−3≥0 and k+3≤$k_{max}$, replace $c_k$ with $$c_k - \left\lfloor \frac{9(c_{k-1} + c_{k+1}) - (c_{k-3} + c_{k+3}) + 8}{16} \right\rfloor$$

(b) Otherwise, if k+1≤$k_{max}$, replace $c_k$ with $$c_k + \left\lfloor \frac{c_{k-1} + c_{k+1} + 1}{2} \right\rfloor$$

(c) Otherwise, replace $c_k$ with $c_k + c_{k-1}$.

2.7.5 Precision Reduction for Color Image Data

After the inverse transformation, a color value in the reconstruction array for each color component is a signed fixed-point value with 6 fractional bits. This value is to be rounded to the nearest integer V. Then if V<−128, V is set to −128, or if V≧128, V is set to 127. Finally, in the luminance (Y) color component only, V is increased by 128.

2.7.6 Precision Reduction for Grayscale Image Data

After the inverse transformation, a grayscale value in the reconstruction array is a signed fixed-point value with 6 fractional bits. This value is to be rounded to the nearest integer V. Then if V<−128, V is set to −128, or if V≧128, V is set to 127. Finally, V is replaced by 127−V.

2.7.7 Conversion from YCbCr Color Space to RGB Color Space

For a color image, each pixel has a value in each of the color component reconstruction buffers. To convert a pixel's YCbCr values to the corresponding RGB values, perform the following transformation:

$$R = Y \qquad +\frac{3}{2}Cr$$

$$G = Y \quad -\frac{1}{4}Cb \quad -\frac{3}{4}Cr$$

$$B = Y \quad +\frac{7}{4}Cb$$

3. Efficient Progressive Decoding

This section presents how the IW44 format enables the construction of an efficient Progressive Decoder. As shown in FIG. 1, a Progressive Decoder 10 can be viewed as composed of two units operating in parallel, namely a Wavelet Decoder 12 previously described in above sections 2.1 to 2.6 and an Image Renderer previously described in above section 2.7 responsive to image data 11 compressed in the DjVu format, previously described in above sections 2.1–2.1.4. The units 12 and 14 communicate via a shared array of wavelet coefficients 16 stored in a standard memory 18.

The techniques presented below have two objectives:

Reducing the memory requirements for the shared array of wavelet coefficients (section 3.3). The number of wavelet coefficients is equal to the number of pixels multiplied by the number of color components. Each wavelet coefficient requires two octets in memory. A drastic reduction of these memory requirement can be achieved because most wavelet coefficients are zero.

Reducing the execution time of the Image Renderer (sections 3.1 and 3.4). This is achieved by using more efficient Wavelet Transforms and by only reconstructing the part of the image which is actually needed.

The techniques presented, either in isolation or in combination, are unique to the IW44 wavelet decoder.

3.1 Lifting Wavelet Transform

The inverse wavelet transform (section 2.7.4) corresponds to a Dubuc-Deslauriers-Lemire (4,4) Interpolative Wavelet Transform. This transform is implemented using the lifting scheme. Reference 3—Sweldens1996 which in that particular case can be implemented using integer arithmetic only. This approach eliminates the need for expensive floating point operations. Furthermore, all the computations described in section 2.7.4 can be carried out using only bit shifts and integer additions or subtraction. No multiplications are needed.

3.2 Wavelet Coefficient Ordering

As described in sections 2.5.1 and 2.7, the IW44 format organizes the wavelet coefficients using two-dimensional arrays (one for each of the Y, Cb, and Cr color components). Each array has one entry for each 32×32 blocks in the image. Each entry itself is a linear array of 1024 coefficients ordered according to the rules specified in section 2.7.3.

FIG. 2 shows how the (y, x) coefficients of a block 32×32 are reordered. FIG. 2a shows the traditional organization of the wavelet coefficients introduced in Reference 1—[Mallat1989]. Dark areas 21 correspond to coefficients representing details of larger sizes. Light areas 22 correspond to coefficients representing details of smaller sizes. FIG. 2b shows the organization of interleaved wavelet coefficients 21 required by a lifting transform. Reference 2—[Sweldens1996]. The coefficient coordinates are formed by inverting the bits of the coordinates in FIG. 2a. FIG. 2c shows the linearized array of coefficients 23 used by the IW44 Wavelet Decoder. The index in the linear array is computed by shuffling the bits of the coefficient coordinates in FIG. 2a. Section 2.7.3. explains how to reorder coefficients organization arranged as in FIG. 2c in order to obtain coefficients arranged as in FIG. 2b. This reordering has two interesting properties:

If a particular wavelet coefficient is zero, then the neighboring wavelet coefficients in the linear array are more likely to be zero. The ordering rules tend to group the zeroes together and therefore enable the sparse array technique described in section 3.3.

Coefficients located in the beginning of the linear array are likely to affect pixels located far away from the corresponding 32×32 block. Coefficients located in the end of the linear array only affect pixels located in the current 32×32 block or in its immediate vicinity. This property is important for implementing the technique described in section 3.4.

3.3 Sparse Wavelet Coefficient Array

In FIG. 3, the memory requirements of the shared array 16 of wavelet coefficients can be drastically reduced by using a sparse array which takes advantage of the fact that a large number of coefficients are zero. A sparse array is a well known technique for efficiently representing arrays when a large number of elements are zero.

Our particular embodiment implements each array of 1024 coefficients corresponding to a 32×32 block using a two level indirection. Four level-one pointers 32 represent each 256 coefficients. These level-one pointers either are zero—meaning that all 256 coefficients are zero—or reference an array of sixteen level-two pointers 34 addressing each set 36 of 16 coefficients. These level-two pointers either are zero - meaning that all 16 coefficients are zero—or reference an array containing the actual values of the 16 coefficients. Null pointers are used when all corresponding coefficients are. Then, there is no need to allocate memory for storing these coefficients equal to zero.

This two level structure is convenient because it matches the structure of the Wavelet encoding scheme:

When the block-band-decoding pass (section 2.6.2) reveals that the coefficient update will result into creating non-zero coefficients within a group of 256 coefficients (16 buckets), the Wavelet Decoder tests the corresponding level-one pointer. If this pointer is zero, the Wavelet Decoder allocates an array of 16 level-two coefficients, initializes these pointers to zero, and causes the level-one pointer to reference this array.

When the bucket-decoding pass (section 2.6.3) reveals that the coefficient update will result into creating non zero coefficients within a bucket of 16 coefficients, the Wavelet Decoder tests the corresponding level-two pointer. If this pointer is zero, the Wavelet Decoder allocates an array of 16 coefficients, initializes them to zero, and causes the level-two pointer to reference this array.

The implementation of FIG. 3 ensures that memory 18 (See FIG. 1) is only allocated when a bucket of 16 coefficients contains one or more non-zero coefficient. This is efficient because the coefficient ordering rules (section 3.2) tend to group the zero coefficients together. The amount memory required for storing these sparse arrays of coefficients is only a fraction of the amount of memory that would be required to store the uncompressed image.

3.4 Partial Rendering

Figure 4:
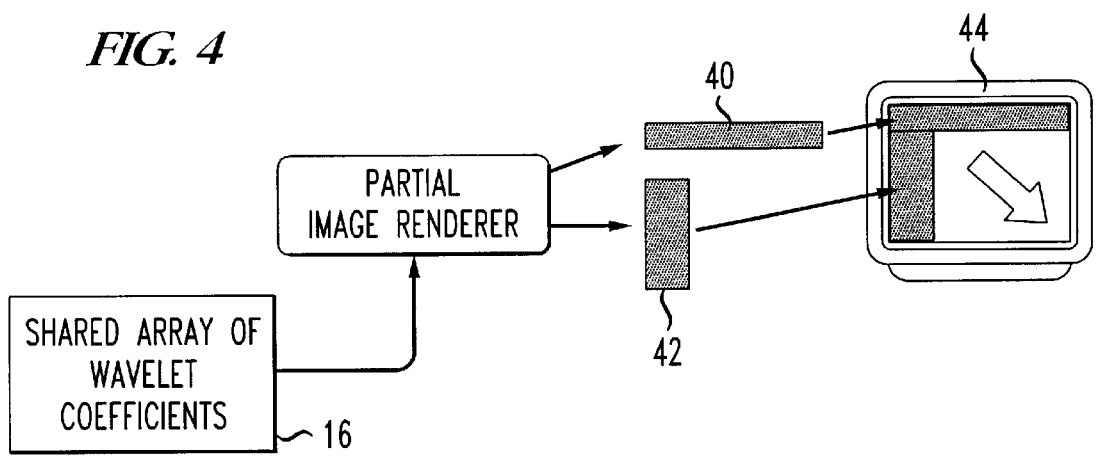
FIG. 4 is a representation of a determination of wavelet coefficients for a partial rendering.

Section 2.7 describes how to compute the values of all pixels in the image. It is preferable however to only compute the values of the pixels that are actually needed. In FIG. 4, for instance, when the user of an image viewer program manipulates scrollbars 40, 42, for display 44 it is sufficient to compute the value of the few pixels uncovered along the edge of the image window. Performing this much smaller computation is considerably faster than re-computing and redisplaying the whole image. The difficulty however consists of retrieving which coefficients are required to compute a predefined set of pixels.

In the present embodiment, the inverse wavelet transform (section 2.7.4) and the coefficient ordering rules (section 2.7.3) ensures that the computation of the pixel values for a particular 32×32 block of the image depend on the following coefficients:

All 1024 coefficients of the wavelet block (cf. definition section 2.2) corresponding to this particular block. There is one such wavelet block for each of the Y, Cb, and Cr color components.

The first 256 coefficients of the wavelet blocks corresponding to the blocks immediately adjacent to the current block. There are at most eight such wavelet blocks for each of the Y, Cb, and Cr color components.

The first coefficient of the wavelet blocks corresponding to the blocks located on the right side and the top side of the eight blocks immediately adjacent to the current block. There are at most six such groups for each of the Y, Cb, and Cr color components.

FIG. 5 represents an image 48 divided in 32×32 blocks. The partial rendering reconstructs a specified segment 50 of this image on the basis of the wavelet coefficients stored in an array 49 of wavelet blocks (c.f. definition section 2.2). The partial rendering consists of 1. Determining the smallest set 52 of 32×32 blocks (the required blocks) containing the desired pixels.

2. Creating a reconstruction array 54 large enough to hold a sub-image large enough to encompass these required blocks, the blocks adjacent to the required blocks, the bottom row of the blocks located on the top side of the adjacent blocks, and the leftmost column of the blocks located on the right side of the adjacent blocks.

3. For each color component, reordering the coefficients of these blocks as described in section 2.7.3, and performing the inverse transform as described in 2.7.4. The reconstruction array 54 contains the wavelet coefficient corresponding to the required blocks and the coefficients required for rendering the desired image segment. These operations are to be performed as if the sub-image mentioned above were the complete image.

4. Extracting the required pixel values and performing the remaining pixel level operations, precision reduction (sections 2.7.5 and 2.7.6) and color conversion (section 2.7.7) in order to reconstruct desired pixels 50.

3.5 SUMMARY

The operation of the decoder 12, renderer 14 and shared arrays 16, as shown in FIG. 1, is summarized, as follows:

In FIG. 6, the wavelet decoder process 600 waits to receive slices of incoming data. A test 601 is performed and a "no" condition continues the decoder in the waiting state. A "yes" condition initiates an operation 603 which reads the relevant coefficients from sparse arrays in the shared array 18. The slices are decoded and the coefficients updated per section 2.6 in an operation 605, followed by writing the updated coefficients into sparse arrays in an operation 607, whereupon the decoder returns to the waiting state. The purpose of the test 601 is to determine whether there are more slices to come. The wavelet decoder process terminates when all slices have been received. Otherwise, it processes the incoming slices 603, 605, 607 and goes back to 601 in order to process a possible new slice.

In FIG. 7, an updated coefficient C is written into the sparse array in a process 700. In an operation 701 the decoder determines the sparse array P containing the coefficient C to be updated. A linear index L of the coefficient C is computed in the sparse array. The level 1 pointer described in FIG. 3 is accessed in an operation 703, where P1=P [L/256]. P1 is compared to zero in a test 705. A "yes" condition initiates test 707 to determine if C=0. If the C does equal 0, the coefficient updating process ends. A "no" condition initiates an operation 709 in which an array P of 16 pointers is allocated. All 16 pointers are set to 0 and P1=P [L/256]=P. The operation 709 returns the process to an operation 711 in which the level 2 pointers are accessed. The level 2 pointers are also described in FIG. 3 and P2=P1 [(L MOD 256)/16]. A test 713 determines if P2 is 0. A "yes" condition initiates a test 715 to determine if C is 0. A "yes" condition ends the process while a "no" condition allocates the array P of 16 coefficients and sets all 16 coefficients to 0 in an operation 717. An operation 719 writes the coefficient C as P2 [(L MOD 16)] and the process ends.

FIG. 8 describes reading the coefficient C from the sparse array in a process 800. An operation 801 determines a sparse array P containing the coefficient C and a linear index L of the coefficient is computed in the sparse array. The level 1 pointers P1 are accessed in an operation 803 where P1=P [L/256]. A test 805 is performed to determine if P1 equals 0. A "yes" condition initiates an operation 807 which sets the coefficient value of C to 0, afterwhich the process ends. A "no" condition for the test 805 initiates an operation 809 which accesses the level 2 pointers where P2=P1 [(L MOD 256)/16]. A test 809 is performed to determine if P2 pointers are at 0. A "yes" condition initiates the operation 807. A "no" condition initiates an operation 813 which reads the coefficient value C as C=P2 [(L MOD 16)] and the process ends after reading the coefficient value.

Figure 9:
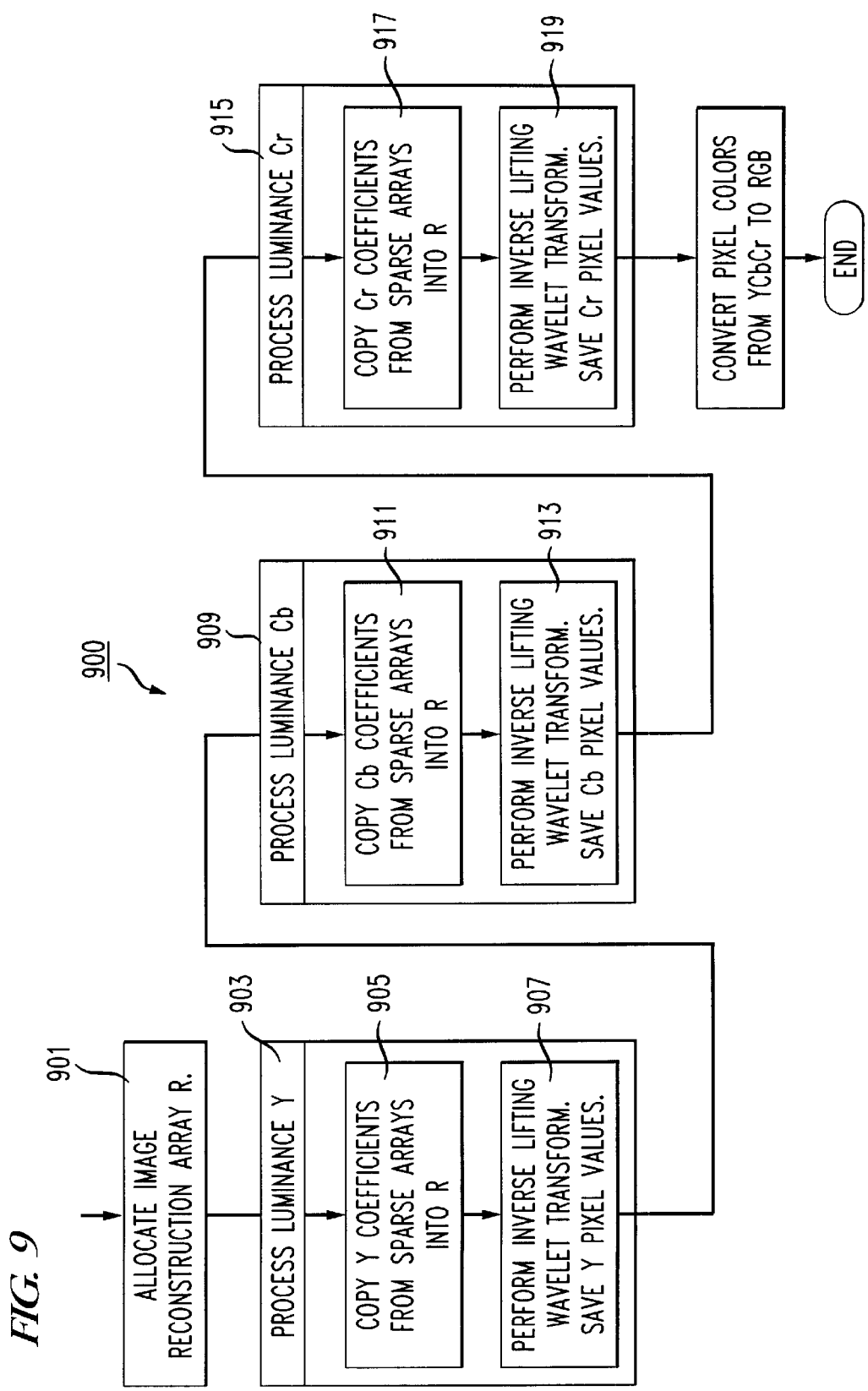
FIG. 9 is a flow chart showing the operation of the image renderer of FIG. 1.

In FIG. 9, the image renderer 6 converts wavelet coefficients from the shared array into pixels in a process 900. An operation 901 allocates an image reconstruction array R. The image components Y for luminance; Chrominance Cb, and Chrominance Cr are processed successively. The luminance component Y is processed in an operation 903. The Y coefficients are copied from the sparse array into the reconstruction array in operation 905. An inverse lifting wavelet transform is performed on the Y and pixel values are saved. in an operation 907. The Chrominances component Cb is processed in an operation 909. The chrominance coefficients Cb are copied from the sparse array into the reconstruction array in an operation 911. An inverse lifting wavelet transform is performed for the Chrominance coefficients Cb and the pixel values are saved in an operation 913. The Chrominance components Cr are processed in operation 915. The Chrominances coefficient Cr are copied from the sparse arrays into the reconstruction array R in an operation 917. An inverse lifting wavelet transform is performed on the coefficients Cr and the pixel values are saved in an operation 919. The pixel colors for the converted Y, $C_v$, Cr are converted to Red (R), Green (G), and Blue (B) for the display in an operation 921, afterwhich the process ends.

The References cited in the Description of the Preferred Embodiment and elsewhere in the specification are, as follows:

1) Bottou, L., Howard, P., and Bengio, Y., 1998. The Z-Coder Adaptive Binary Coder. In *Pro. IEEE Data Compression Conference* 1998, Snowbird. IEEE.
2) Mallat, S., 1989. A theory for multiresolution digital signal decomposition: The wavelet representation. *IEEE Transactions on Pattern Analysis and Machine Intelligence*, 11:674–693.
3) Sweldens, W., 1996. The lifting scheme: A custom-design construction of biorthogonal wavelets. *Journal of Applied Computing and Harmonic Analysis*, 3:186–200.

While the invention has been shown and described with respect to a specific embodiment, various changes can be made without departing from the spirit and scope of the invention as defined in the appended claims, in which:

We claim:

1. A progressive image decoder for a wavelet encoded image, comprising:
   a wavelet decoder responsive to received segments of encoded levels of said frame, which are compressed image data for said frame;
   a memory for storing an array of wavelet coefficients produced by said decoder, in a sparse array data structure;
   circuitry for updating said sparse array that is stored in said memory in said sparse array data structure based on data decoded by said wavelet decoder for each of said segments; and
   an image renderer responsive to said wavelet coefficients in said memory.

2. The progressive image decoder of claim 1 wherein the compressed image data is in IW44 format.

3. The progressive image decoder of claim 1 wherein the inverse wavelet transform is an inverse lifting transform.

4. The progressive image decoder of claim 1 wherein the sparse array structure comprises a first-level array of pointers, each indicating either that a first-sized block of coefficients contains nothing but zeros, or points to an array of second-level array pointers, each of said second-level array pointers indicating either that a second-sized block of coefficients contains nothing but zeros, or not; where size of said first-sized block is a multiple of size of said second-sized block.

5. The progressive image decoder of claim 1 further comprising a module that, in response to a specification to reconstruct a particular desired part of an said image, locates subsets of the wavelet coefficients in said memory that are sufficient to reconstruct pixels belonging to said desired part of the image.

6. The progressive image decoder of claim 5 wherein said array comprises a plurality of sparse sub-arrays of wavelet coefficients, and each of said sparse sub-arrays of wavelet coefficients corresponds to a particular subset of pixels in the image.

7. The progressive image decoder of claim 6 wherein the subset of wavelet coefficients further comprises:
   means for locating the subset of wavelet coefficients by first identifying which blocks of the image contain said pixels.

8. the progressive image decoder of claim 7 where said image renderer includes a processor that executes an inverse wavelet transform on said subsets of wavelet coefficients.

9. The decoder of claim 1 where said segments are slices.

10. The decoder of claim 1 wherein the array of coefficients comprises:
    a plurality of two-dimensional arrays, one for each of the color components, having one entry corresponding to each block in the image of size 32×32, each entry containing 1024 wavelet coefficients organized as a sparse array having a structure that comprises a first-level array of pointer, each indicating either that a first-sized block of coefficients contains nothing but zeros, or points to an array of second-level array pointers, each indicating either that a second-sized block of coefficients contains nothing but zeros, or not, where size of said first-sized block is a multiple of size of said second-sized block.

11. The decoder of claim 8 further comprising:
    means for triggering the second component when enough data has been received to display an updated version of the image, or when a user performs an action which requires displaying a new part of the image.

12. The decoder of claim 8 further comprising:
    means for reducing computation time of the second component by using "lifting" for implementing a fast inverse wavelet transform.

13. In a progressive image display decoder for wavelet encoded images including a first component and a second component communicating via a shared array of wavelet transform coefficients, a method of achieving reduced storage requirements for wavelet transform coefficients and reduced execution time in displaying the image, comprising the steps of:
    receiving compressed image data and producing decoded data;
    maintaining a plurality of sparse arrays of wavelet coefficients;
    updating said sparse array using said decoded data; and
    applying an inverse wavelet transformation to the wavelet coefficients.

14. The method of claim 13 further comprising the step of locating subsets of the wavelet coefficients that are sufficient to reconstruct pixels belonging to part of the image specified by said user to be rendered.

15. The method of claim 13 further comprising the step of:
    locating the subset of wavelet coefficients by first identifying which blocks of the image contain said pixels.

* * * * *